United States Patent
Goldwitz

(10) Patent No.: US 12,247,421 B2
(45) Date of Patent: Mar. 11, 2025

(54) DEVICES AND METHODS FOR SECURING AN AREA IN A VEHICLE, METHODS OF MAKING DEVICES FOR SECURING AN AREA IN A VEHICLE, AND VEHICLES WITH A DEVICE FOR SECURING AN AREA

(71) Applicant: Brian Goldwitz, Orange, CT (US)

(72) Inventor: Brian Goldwitz, Orange, CT (US)

(73) Assignee: Brian Goldwitz, Orange, CT (US)

( * ) Notice: Subject to any disclaimer, the term of this patent is extended or adjusted under 35 U.S.C. 154(b) by 422 days.

(21) Appl. No.: 17/536,990

(22) Filed: Nov. 29, 2021

(65) Prior Publication Data
US 2023/0175293 A1   Jun. 8, 2023

(51) Int. Cl.
*E05B 83/20*   (2014.01)

(52) U.S. Cl.
CPC ................... *E05B 83/20* (2013.01)

(58) Field of Classification Search
CPC ......... E05B 83/18; E05B 83/20; B60R 5/045; B60R 5/044
USPC ...................................................... 292/341.15
See application file for complete search history.

(56) References Cited

U.S. PATENT DOCUMENTS

| | | | | |
|---|---|---|---|---|
| 6,056,177 A * | 5/2000 | Schneider | ................. | B60R 5/04 224/539 |
| 6,401,995 B1 * | 6/2002 | Yuille | ....................... | B60R 9/00 224/404 |
| 6,540,134 B1 * | 4/2003 | Rasche | ................. | B65D 11/18 220/4.28 |
| 9,387,812 B2 * | 7/2016 | Bexar | ..................... | B60R 5/041 |
| 10,232,690 B1 * | 3/2019 | Huggett | ................... | B60J 7/198 |
| 10,399,505 B1 * | 9/2019 | Brackman | .............. | B60R 9/065 |
| 11,529,909 B2 * | 12/2022 | Singer | ....................... | B60P 7/14 |
| 2018/0105117 A1 * | 4/2018 | Goldwitz | ................ | B60R 5/045 |
| 2018/0134223 A1 * | 5/2018 | Goldwitz | ................ | B60R 5/045 |
| 2018/0147927 A1 * | 5/2018 | Burkhardt | .............. | B60J 7/1855 |
| 2018/0147995 A1 * | 5/2018 | Goldwitz | ................ | B60R 9/065 |

FOREIGN PATENT DOCUMENTS

CA   2700005 A1 * 10/2011 ............. B60R 11/06

* cited by examiner

*Primary Examiner* — Eugene G Byrd
*Assistant Examiner* — James Edward Ignaczewski
(74) *Attorney, Agent, or Firm* — LOZA & LOZA LLP/JML

(57) ABSTRACT

Security devices include a side panel movably coupled to an attachment mechanism and to a top panel. An extension side panel may be moveably coupled to the side panel and configured to adjust laterally inward and outward relative to the side panel. The side panel is positioned at least substantially transverse to the top panel with the extension side panel extending laterally outward from the side panel when in a secured position, and at least substantially parallel to the top panel with the at least one extension side panel positioned laterally inward and adjacent to the side panel when in a storage position. Other aspects, embodiments, and features are also included.

20 Claims, 14 Drawing Sheets

DEVICES AND METHODS FOR SECURING AN AREA IN A VEHICLE, METHODS OF MAKING DEVICES FOR SECURING AN AREA IN A VEHICLE, AND VEHICLES WITH A DEVICE FOR SECURING AN AREA

TECHNICAL FIELD

The technology discussed below relates generally to automotive features, and more specifically to devices for securing areas of a vehicle that are typically open to passersby.

BACKGROUND

JEEP is a brand of American automobiles that makes sport utility vehicles and off-road vehicles. Some models of vehicles produced under the JEEP brand include option to use an open interior configuration where the interior of the vehicle is generally open to the surrounding environment. This can create problems for securely leaving items inside the vehicle when it is unattended.

Accordingly, it may be desirable to provide devices and methods for securing an area in such vehicles from passersby. Such area can be utilized to leave items that may be easily stolen if left within unsecured areas of the vehicle.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate the securing of an area within a vehicle. At least one aspect of the present disclosure includes security devices for securing an area within a vehicle. According to at least one embodiment, a security device may include an attachment mechanism sized and shaped to be coupled to a portion of a vehicle. A side panel may be movably coupled to the attachment mechanism along a first adjoining edge of the side panel, and a top panel may be movably coupled to the side panel along a second adjoining edge of the side panel. At least one extension side panel may be movably coupled to the side panel and configured to be adjusted laterally inward and outward relative to the side panel.

Additional embodiments of a security device may include a top panel and a side panel hingedly coupled to the top panel. An extension side panel may be hingedly coupled to the side panel to be adjusted laterally inward and outward relative to the side panel. The side panel may be positioned at least substantially transverse to the top panel, and the extension side panel may extend laterally outward from the side panel in a secured position. Further, the side panel may be positioned at least substantially parallel to the top panel, and the extension side panel may be positioned laterally inward relative to the side panel and adjacent the side panel in a storage position.

Further aspects of the present disclosure include vehicles including a security device. According to one or more embodiments, a vehicle according to the present disclosure may include a trunk space with a floor surface. A side panel may be positioned within the trunk space and hingedly coupled to a portion of the trunk space. An extension side panel may be movably coupled to the side panel and configured to be adjusted laterally inward and outward relative to the side panel panel. In a secured position, the side panel and the extension side panel may be positioned at least substantially transverse to the top panel and to the floor surface. In a storage position, the side panel may be positioned at least substantially parallel to the top panel and to the floor surface with a surface of the extension side panel positioned adjacent to a surface of the side panel.

Other aspects, features, and embodiments associated with the present disclosure will become apparent to those of ordinary skill in the art upon reviewing the following description in conjunction with the accompanying figures.

DRAWINGS

DETAILED DESCRIPTION

The illustrations presented herein are, in some instances, not actual views of any particular security device or vehicle, but are merely idealized representations which are employed to describe one or more aspects of the present disclosure. Additionally, elements common between figures may retain the same numerical designation.

Figure 1:
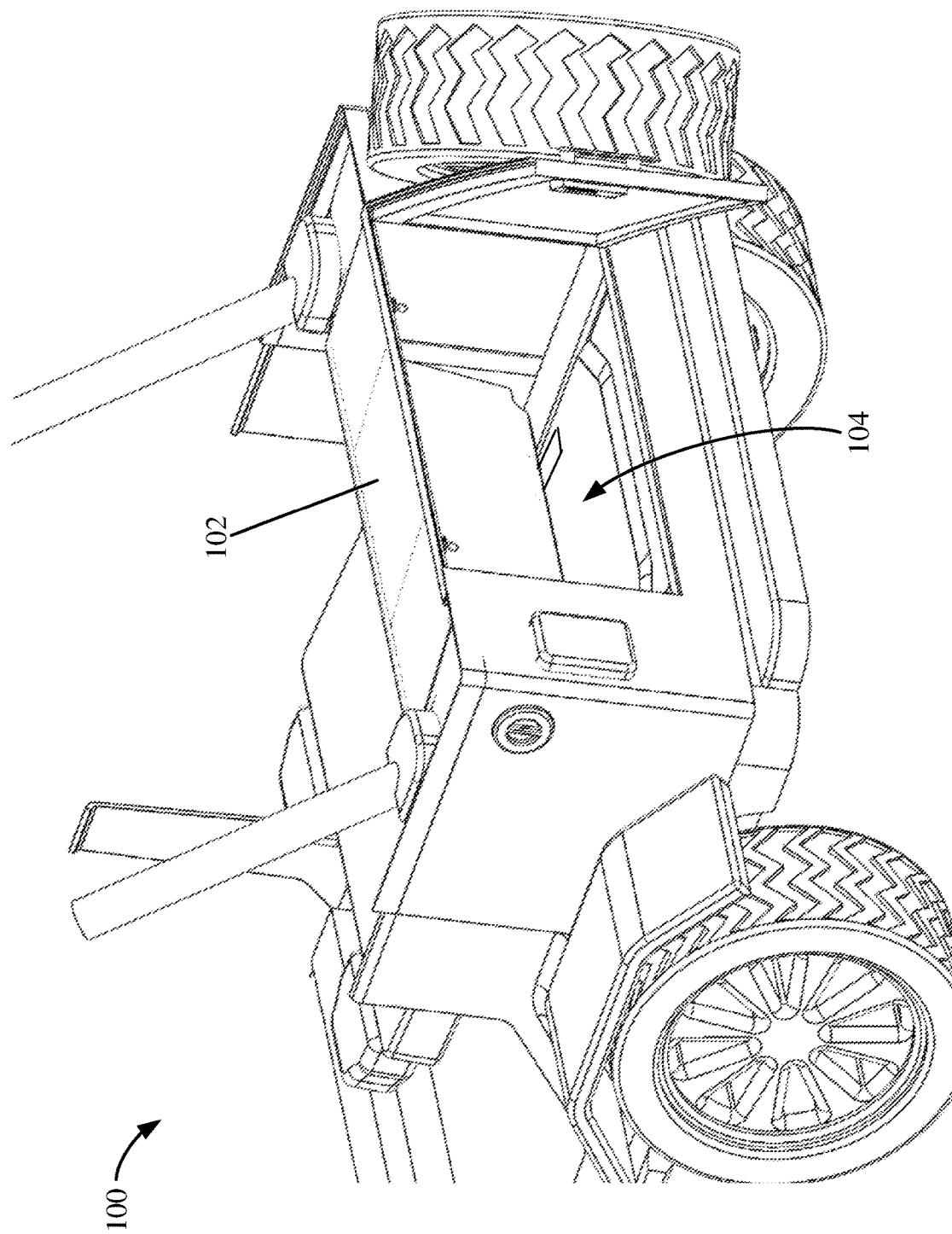
FIG. 1 is an isometric view of a rear of a vehicle with a security device in a secured position according to at least one embodiment of the present disclosure.

Aspects of the present disclosure relate to devices that facilitate securing items in an area of a vehicle. In at least some embodiments, such devices can secure a back or trunk area of a jeep or other similarly configured vehicle. FIG. 1 shows a partial view of a vehicle 100 according to one example. As depicted, a security device 102 is hingedly coupled to a portion of the vehicle 100. In the depicted example, the security device 102 is in a secured position. In the secured position, the security device 102 secures an area 104 within the vehicle 100 from persons outside the vehicle 100.

Figure 2:
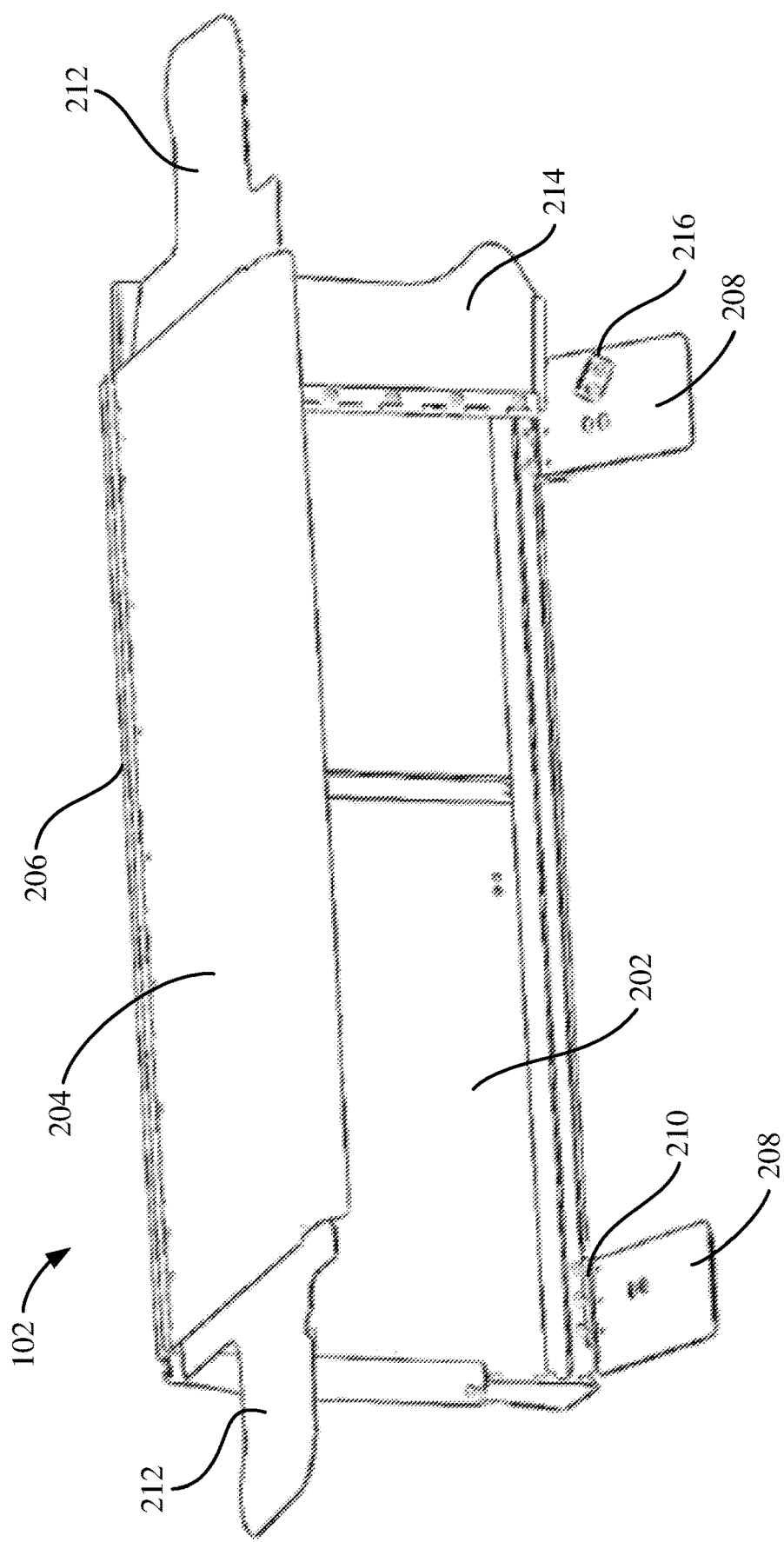
FIG. 2 is a top isometric view of a security device according to at least one example of the present disclosure.

FIG. 2 is a top isometric view of the security device 102 according to at least one example of the present disclosure. As shown, the security device 102 includes a side panel 202 and a top panel 204. The side panel 202 and the top panel 204 are movably coupled together along an adjoining edge 206. In at least one example, a hinge may be utilized to couple the side panel 202 and the top panel 204 together along the adjoining edge 206.

An attachment mechanism 208 may also be movably coupled to the side panel 202 along an adjoining edge 210. In at least one example, the attachment mechanism 208 can be movably coupled to the side panel 202 with one or more hinges along the adjoining edge 210. The attachment mechanism 208 may be configured to fasten to a portion of the vehicle utilizing one or more fasteners, such as a bolt, a screw, adhesive, or other mechanism for coupling the attachment mechanism 208 to the vehicle.

Figure 3:
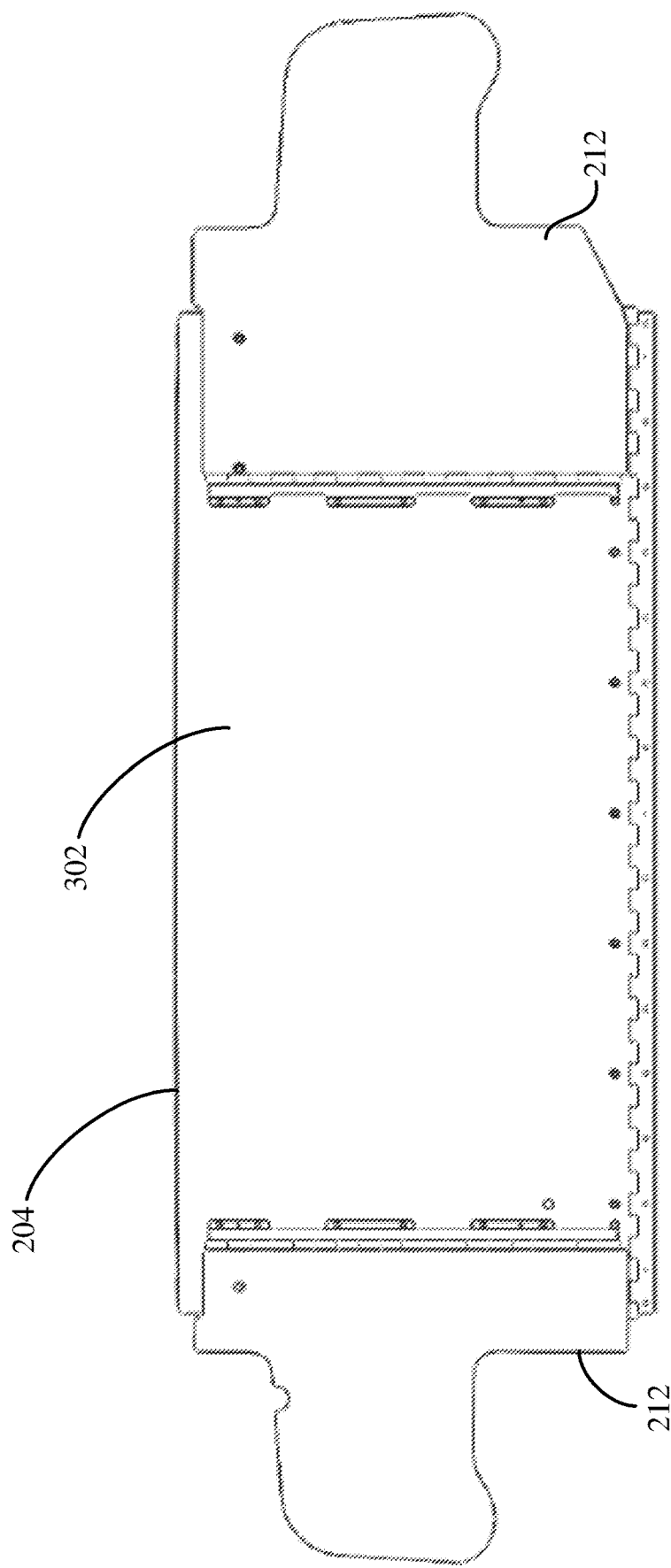
FIG. 3 is a bottom view of the top panel of the security device in FIG. 2 according to at least one example of the present disclosure.

The top panel 204 may include an extension structure 212 movably coupled to the top panel 204 so that the extension structure 212 can be adjusted laterally outward and inward with respect to the top panel 204. As shown in FIG. 3, which illustrates a bottom view of the top panel 204, the extension structures 212 may be hingedly coupled to the top panel 204.

Although the extension structures 212 are configured in FIG. 3 as panels hingedly coupled to the bottom surface 302 of the top panel 204, other embodiments may employ different structure that is coupled to the top panel 204 so as to be able to move or adjust between a laterally outward position and a laterally inward position. For example, extension structures may be configured as a rod movably coupled to the top panel 204 so that the rod can be adjusted lateral outward and inward with respect to the top panel 204. In other embodiments, the extension structures 212 may include locking panels that are slidably coupled to the top panel 204, to slide laterally outward and inward. Further, one or more embodiments of an extension structure 212 may be coupled to a different surface (e.g., the top surface) or to an edge of the top panel 204 in one or more other examples. In still further embodiments, an extension structure 212 may be coupled to the vehicle instead of the top panel 204, and configured to move laterally inward or outward relative to the top panel 204 to perform similar functions as the extension structures 212 described above.

Figure 4:
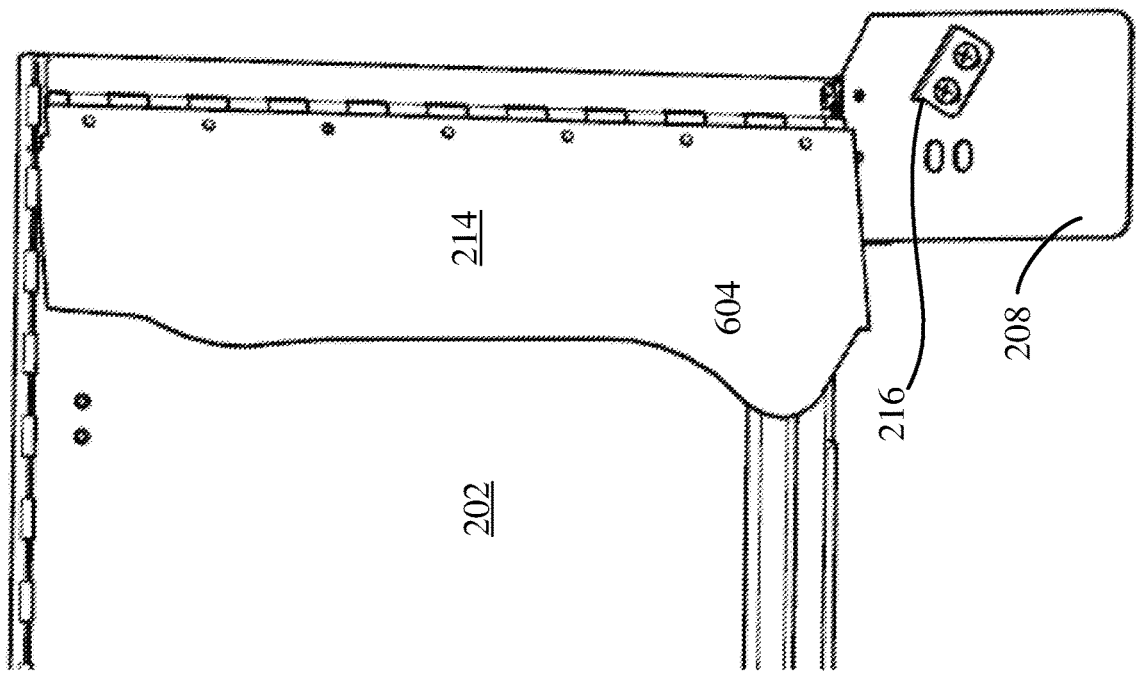
FIG. 4 are magnified elevation views of a portion of the side panel with an extension side panel depicted in an open position and a closed position according to at least one example of the present disclosure.
Figure 4:
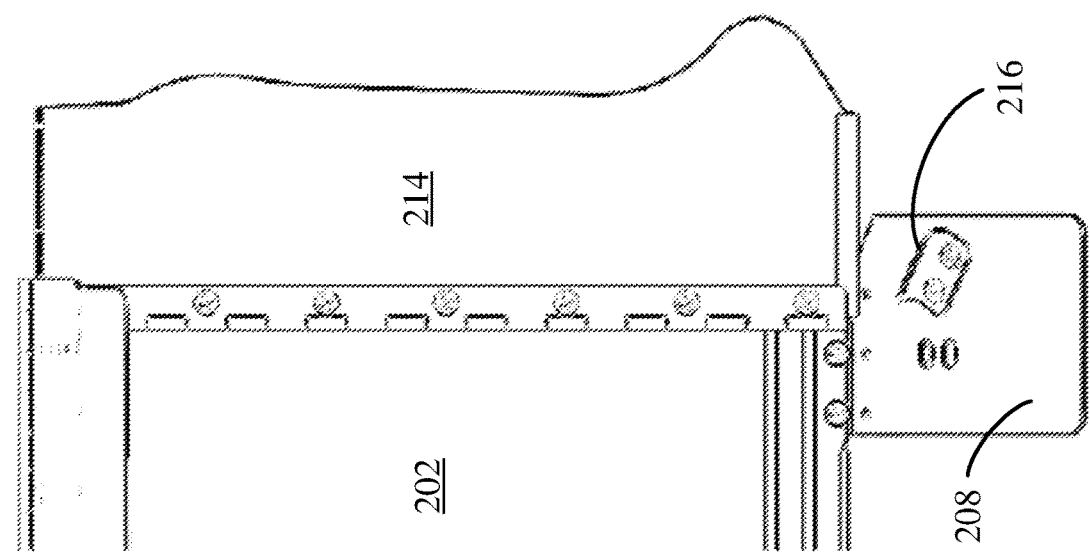

Referring again to FIG. 2, the side panel 202 may include an extension side panel 214 moveably coupled to the side panel 202 so that the extension side panel 214 can be adjusted laterally outward and inward with respect to the side panel 202. Turning to FIG. 4, magnified views of a portion of the side panel 202 with an extension side panel 214 is shown according to at least one example. On the left side of FIG. 4, the extension side panel 214 is shown laterally extended outward relative to the side panel 202. On the right side of FIG. 4, the extension side panel 214 is shown laterally inward relative to the side panel 202. As shown, the extension side panel 214 may be hingedly coupled to the side panel 202 to facilitate folding the extension side panel 214 laterally inward and outward relative to the side panel 202. The extension side panel 214 may extend outward beyond a side edge of the top panel 204 according to various embodiments, such as in the embodiment depicted in FIG. 2.

Referring again to FIG. 2, one or more embodiments may include a motion inhibiting component 216. The motion inhibiting component 216 may be a protrusion, in some embodiments, located to stop the extension side panel 214 from being retracted in use. For example, the motion inhibiting component 216 depicted in FIG. 4 may be positioned to protrude from the attachment mechanism 208 to inhibit the extension side panel 214 from being folded laterally inward beyond the motion inhibiting component 216. In other examples, the motion inhibiting component 216 may be a slot or other feature configured to stop the extension side panel 214 from being retracted while in use.

Figure 5:
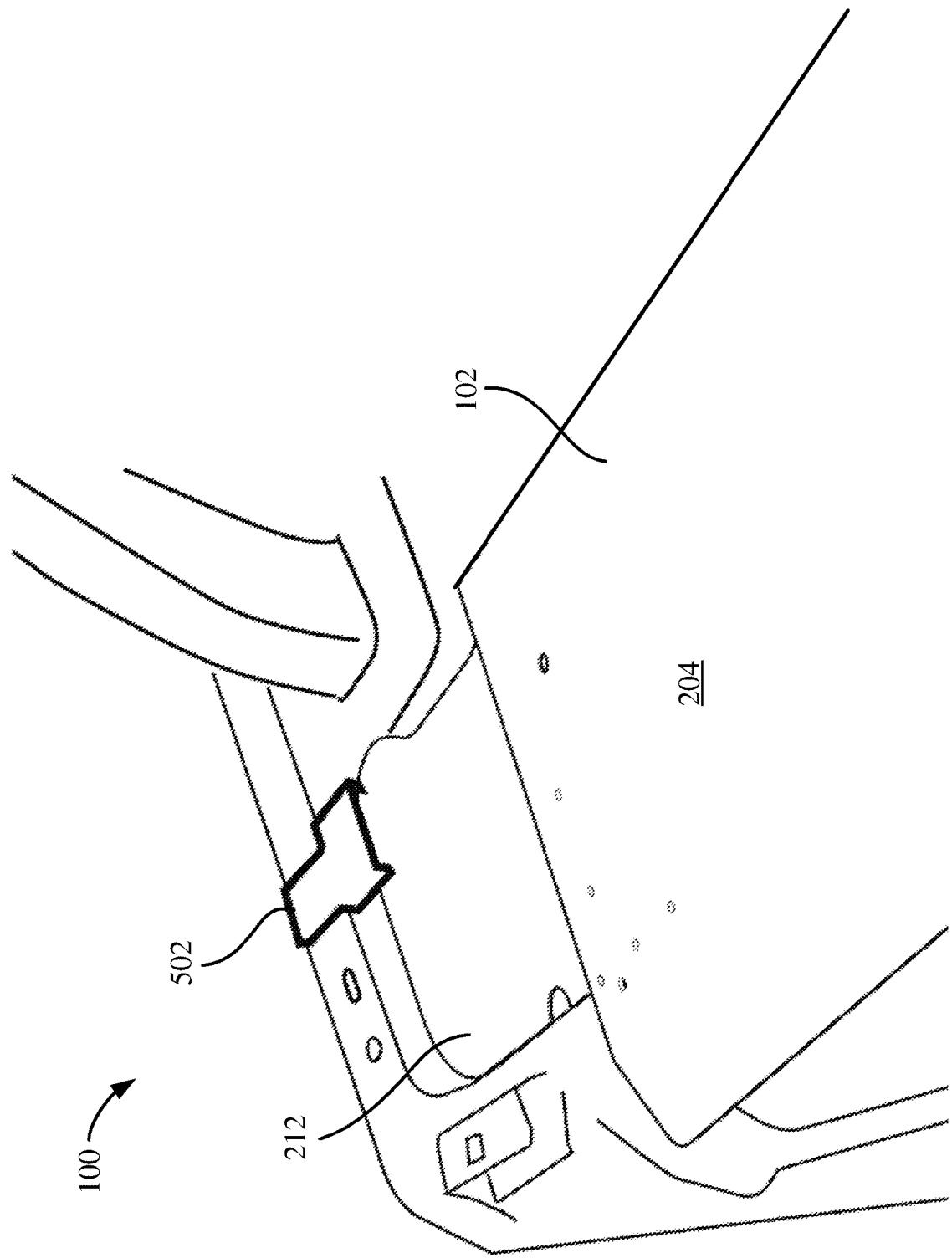
FIG. 5 is an isometric view of a portion of the rear of a vehicle with a locking mechanism according to one or more examples of the present disclosure.

Turning to FIG. 5, an isometric view of a portion of the rear of a vehicle 100 is shown with a locking mechanism 502 according to one or more examples of the present disclosure. As shown, a locking mechanism 502 may include a protrusion coupled to the vehicle 100 and extending toward the interior of the vehicle 100 above an extension structure 212 of the security device 102. When the extension structure 212 is positioned in the laterally outward position, the extension structure 212 is located below the locking mechanism 502. As a result, the locking mechanism 502 inhibits the extension structure 212, as well as the top panel 204, from being lifted upward when the security device 102 is in the secured position.

Figure 6:
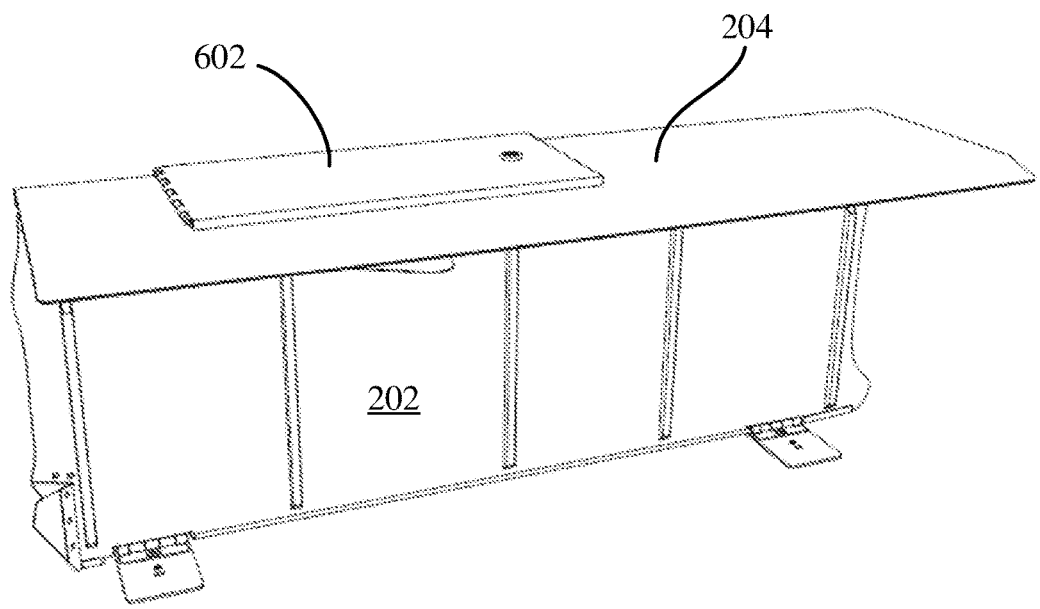
FIG. 6 are isometric views of a security device incorporating a hinged door in the top panel depicted in both an open position and a closed position according to at least one example of the present disclosure.
Figure 6:
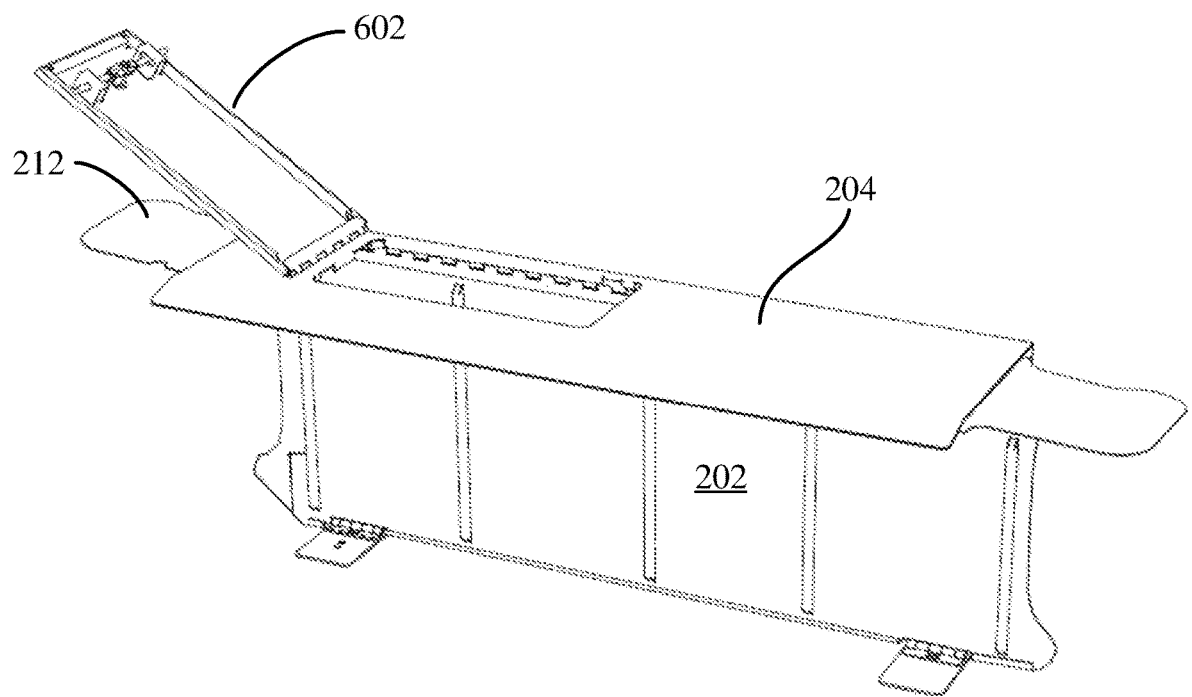

According to various aspects of the present disclosure, the security device 102 may include one or more doors to facilitate access into the secured area 104 (see FIG. 1) when the security device 102 is in the secured position. FIG. 6 are isometric views of a security device incorporating a hinged door 602 in the top panel 204 according to one or more examples. The top image shows the door 602 in the closed position, and the bottom image shows the door 602 in an open position.

Figure 7:
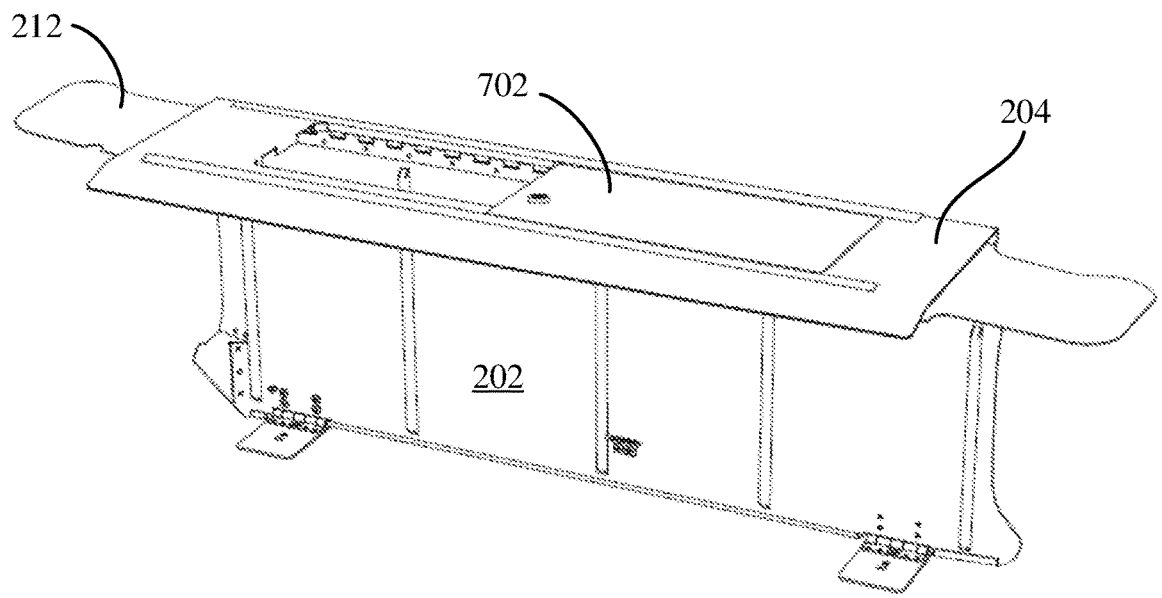
FIG. 7 are isometric views of a security device incorporating a sliding door in the top panel depicted in both a closed position and an open position according to at least one example of the present disclosure.
Figure 7:
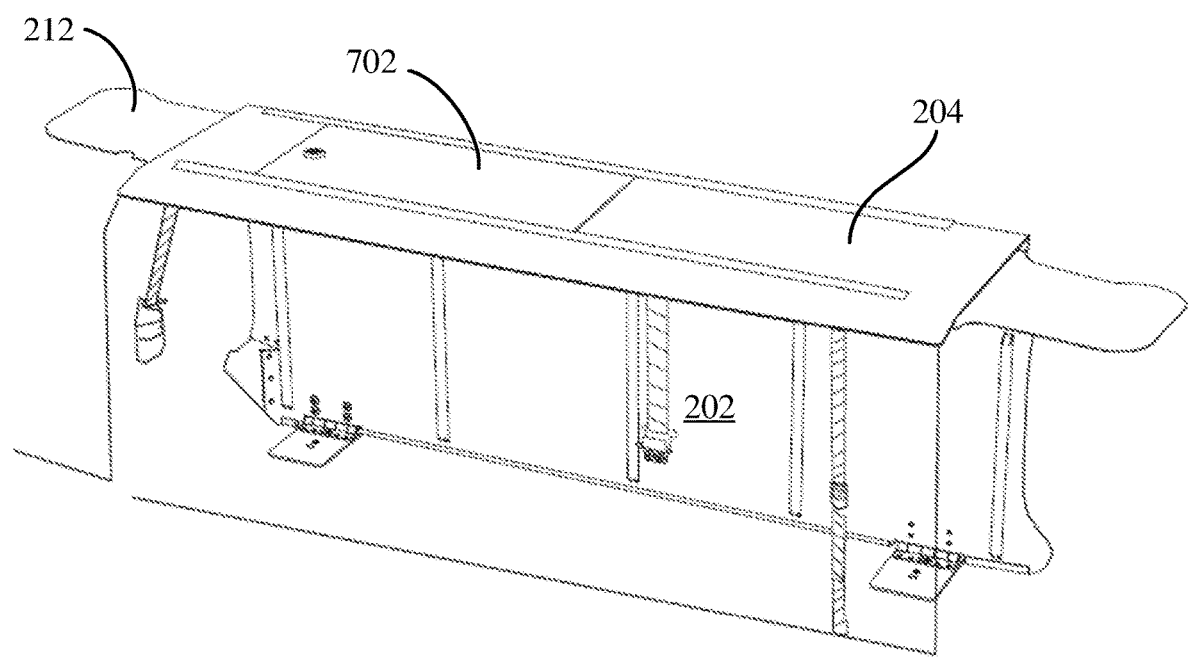

FIG. 7 are isometric views of a security device incorporating a sliding door 702 in the top panel 204 according to one or more examples. The top image shows the door 702 in the open position, and the bottom image shows the door 702 in the closed position.

Figure 8:
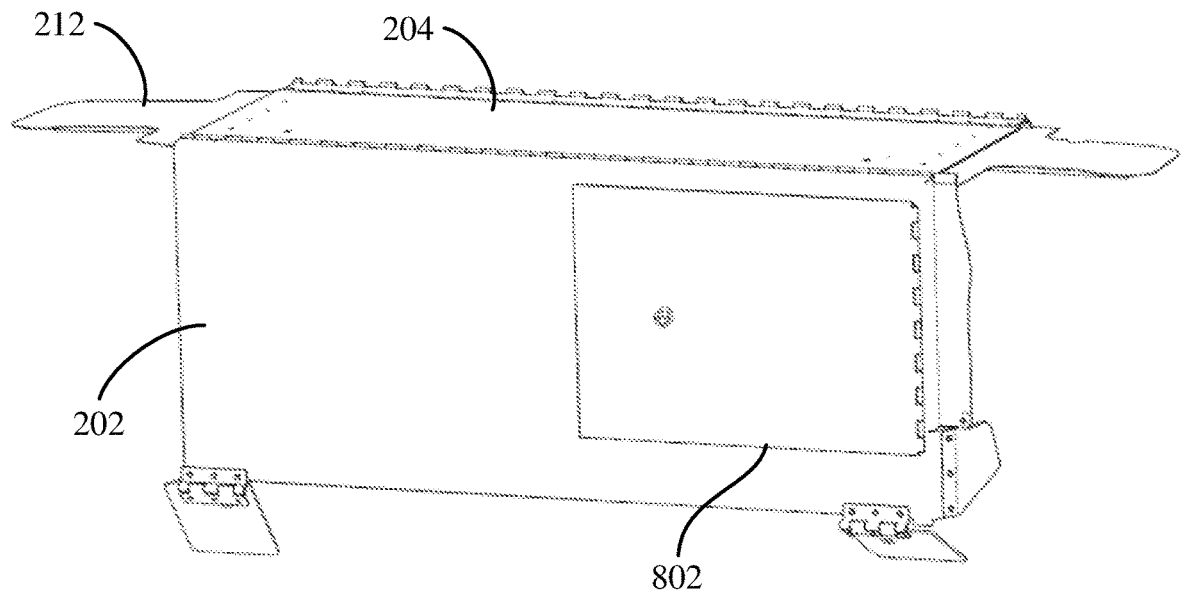
FIG. 8 are isometric views of a security device incorporating a hinged door in the side panel depicted in both a closed position and an open position according to at least one example of the present disclosure.
Figure 8:
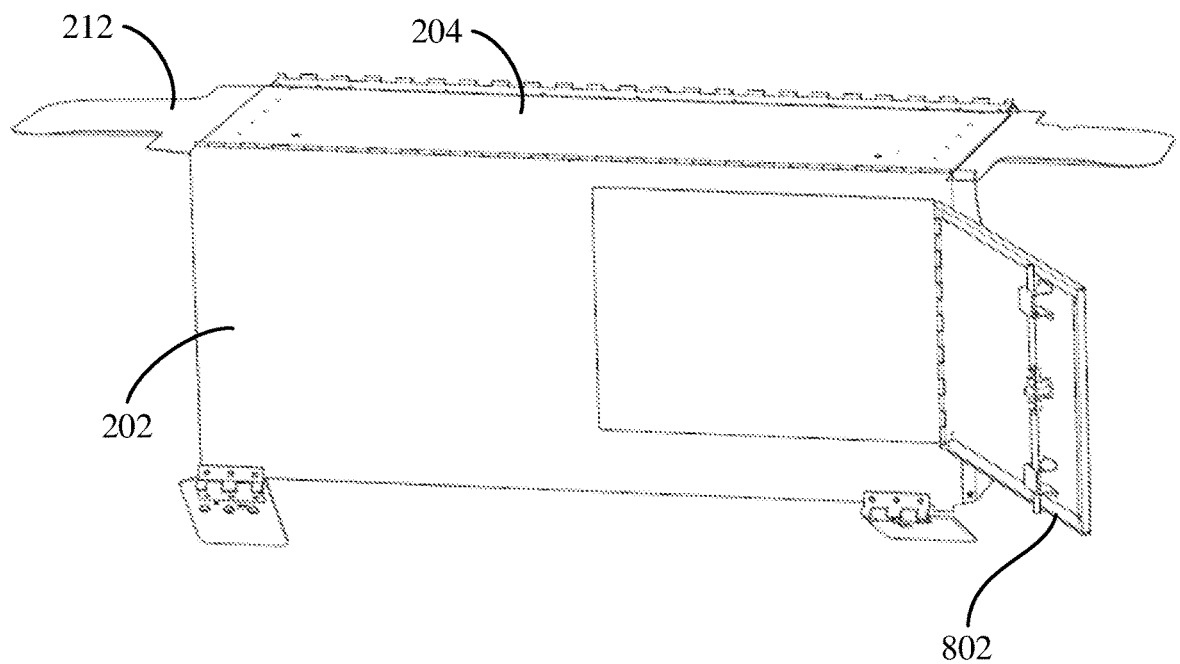

FIG. 8 are isometric views of a security device incorporating a hinged door 802 in the side panel 202 according to one or more examples. The top image shows the door 802 in the closed position, and the bottom image shows the door 802 in the open position.

Figure 9:
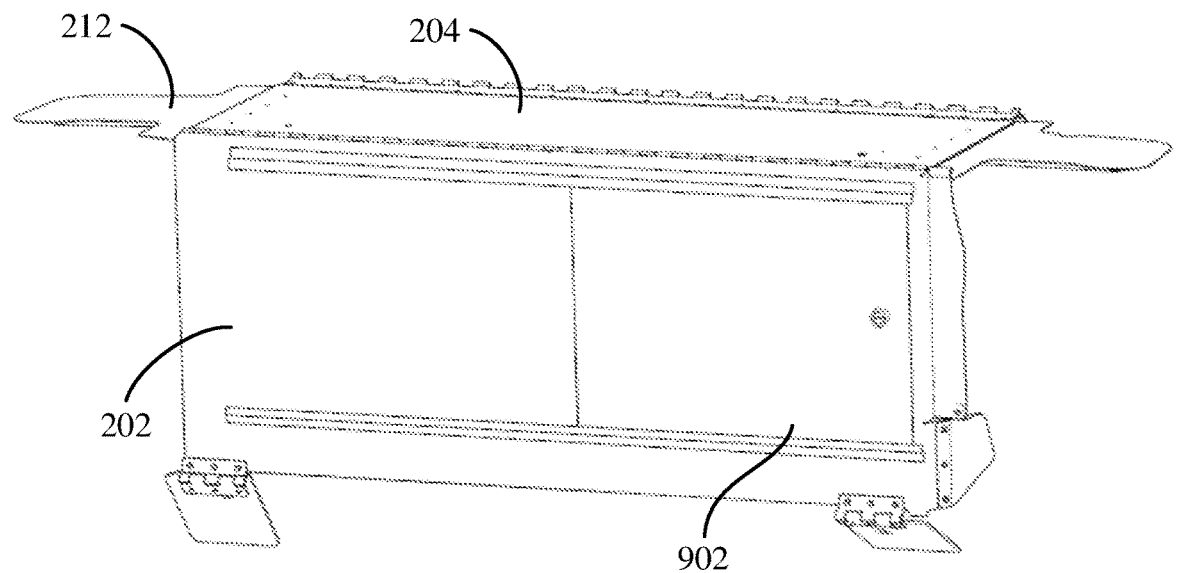
FIG. 9 are isometric views of a security device incorporating a sliding door in the side panel depicted in both an open position and a closed position according to at least one example of the present disclosure.
Figure 9:
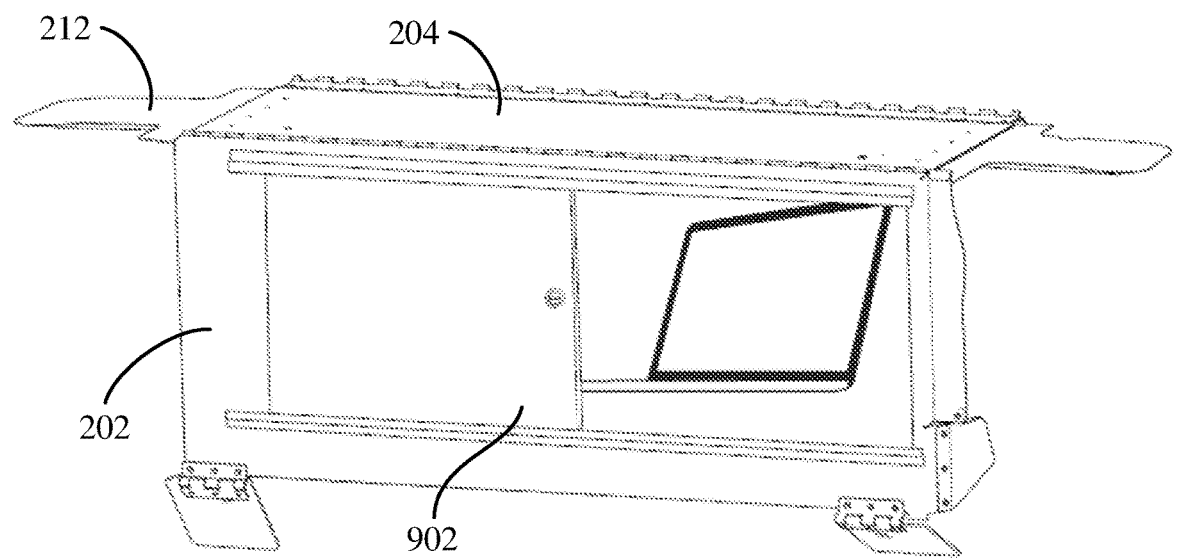

FIG. 9 are isometric views of a security device incorporating a sliding door 902 in the side panel 202 according to one or more examples. The top image shows the door 902 in the closed position, and the bottom image shows the door 902 in the open position.

Figure 10:
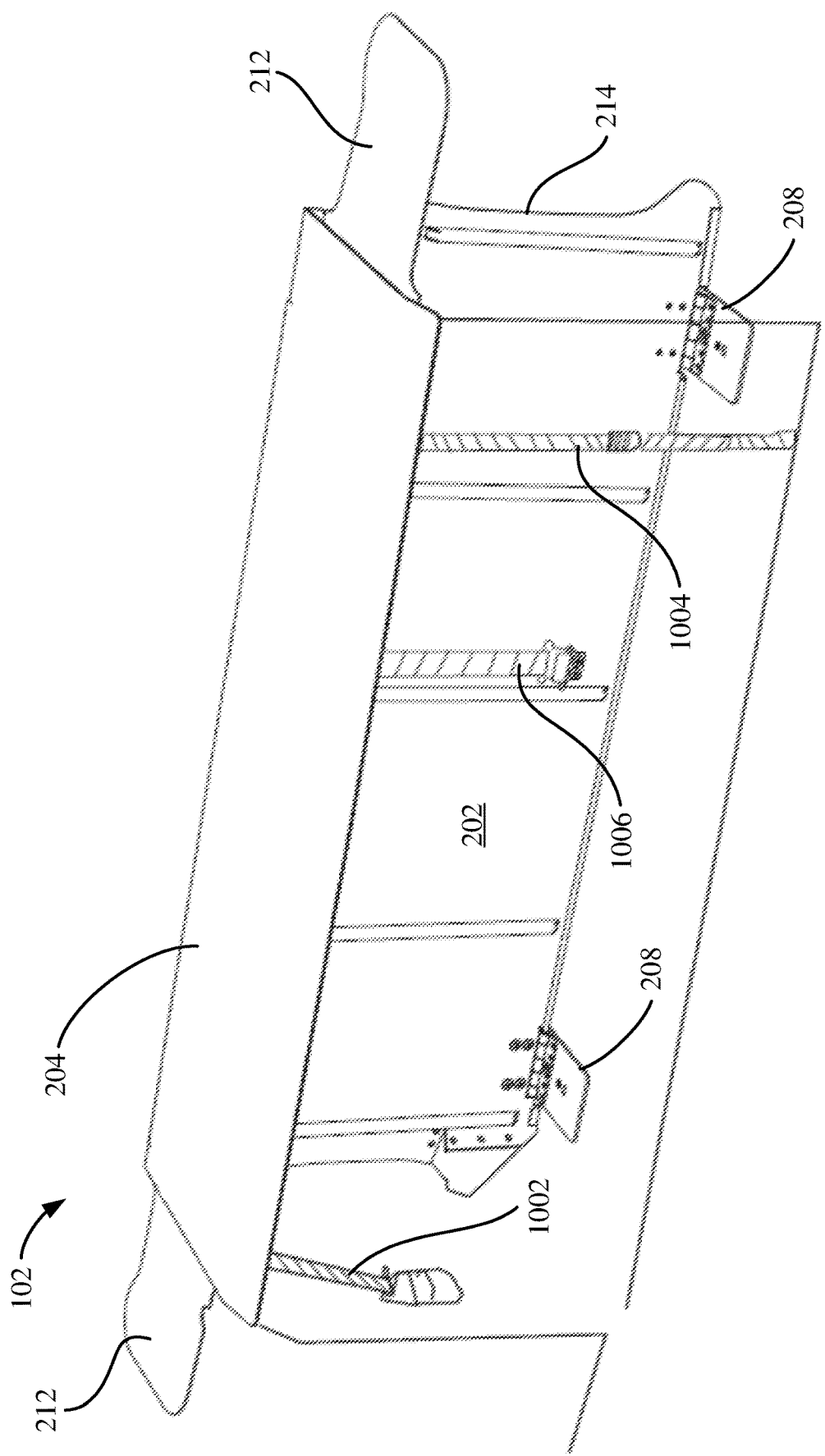
FIG. 10 is an isometric view of a security device according to one embodiment employing one or more straps.

In some embodiments, a security device 102 may include straps configured to aid in securing the security device 102 to the vehicle. FIG. 10 is an isometric view of a security device 102 according to one embodiment employing one or more straps. As shown, a strap 1002 may be coupled to the side panel 202, the top panel 204, or both. The strap 1002 may further couple to an interior portion of the vehicle 100 to tie down the top panel 204 or the side panel 202. Similarly, a strap 1004 may be coupled to the side panel 202, the top panel 204, or both. The strap 1004 may also couple to an interior portion of the vehicle 100. According to various embodiments, the straps 1002 and 1004 may couple to a sidewall portion of the interior of the vehicle 100, a floor portion of the interior of the vehicle 100, or some combination thereof.

Figure 11:
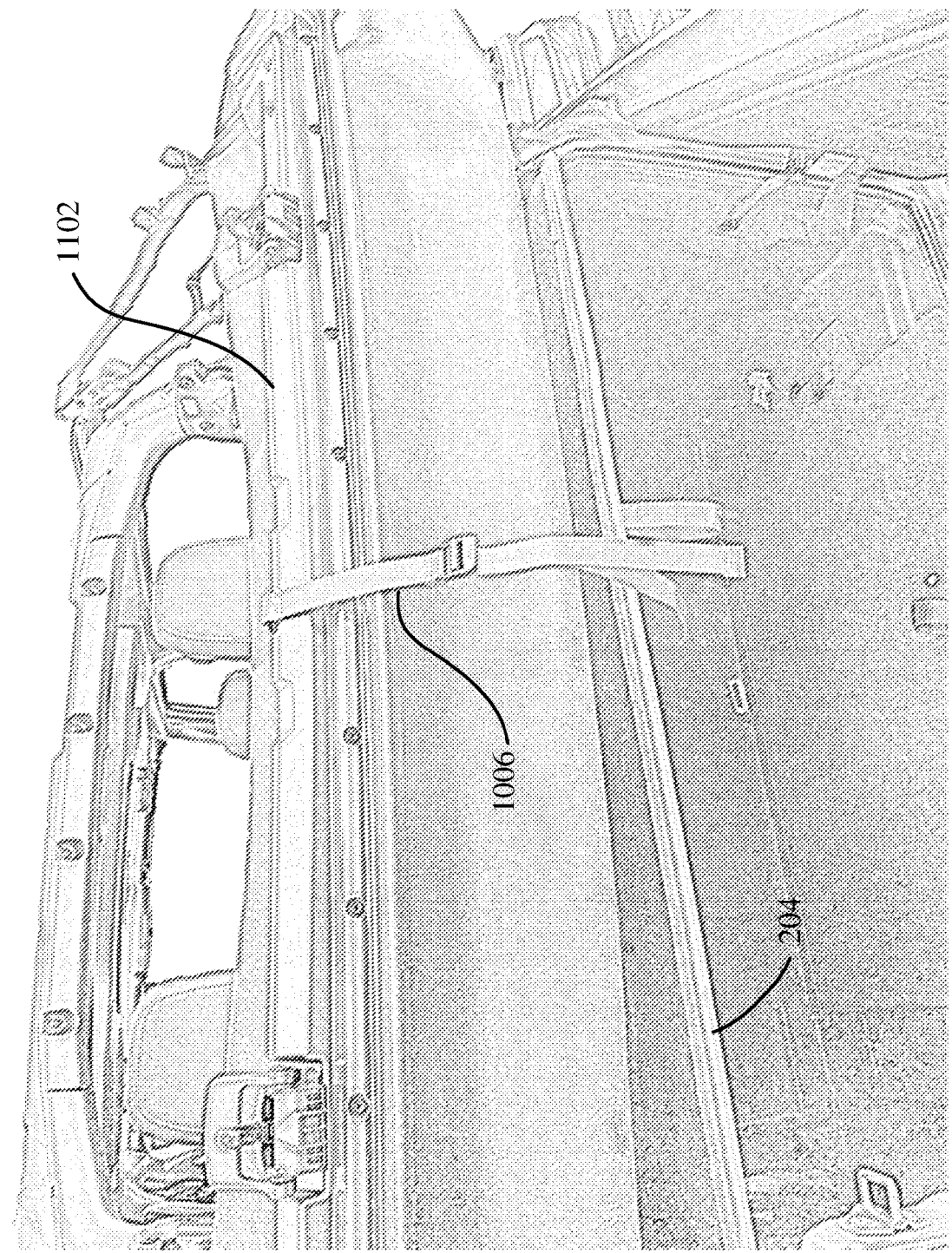
FIG. 11 is an isometric view of a security device employing a strap to secure a soft-top cover employed with a vehicle.

In some embodiments, a security device 102 may include a soft-top strap 1006. JEEP vehicles can be used with what is commonly referred to as a soft-top. In some embodiments, the soft-top strap 1006 may be coupled to the side panel 202, the top panel 204, or both, and may extend from the security device 102 to a portion of the soft-top 1102 to secure and keep the soft-top portion in place, as shown in FIG. 11. The soft-top strap 1006 may be employed when a soft-top is inhibited from securing to the vehicle frame caused by the location of the security device 102. As a result, a use can employ both the soft-top and the security device 102

Figure 12:
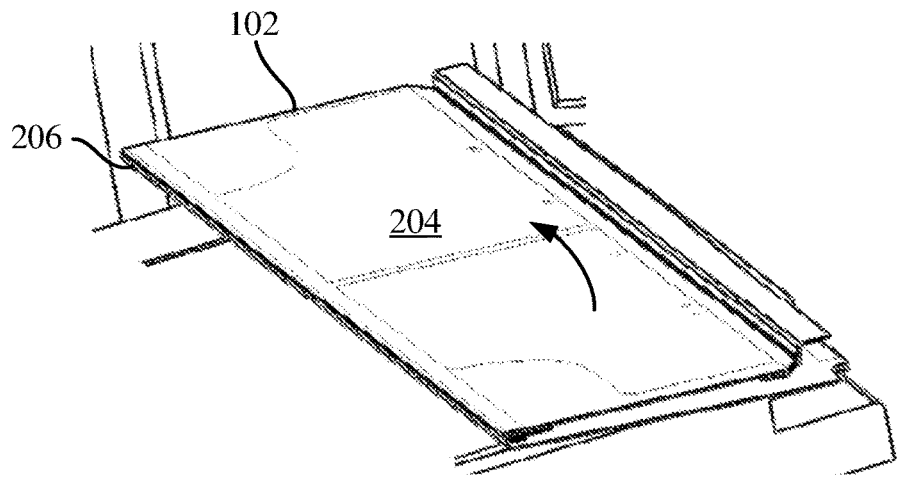
FIG. 12 is a partially sectioned isometric view of a rear of a vehicle with a security device in a storage position according to at least one embodiment of the present disclosure.

In operation, the security device 102 of the present disclosure can operate in both a secured position and in a storage position, and can be transitioned between the two positions. FIG. 1 illustrates the security device 102 in the secured position, and FIG. 12 illustrate an example of the security device 102 in the storage position. The security device 102 can be folded down in the storage position, such that the side panel 202 is positioned at least substantially parallel to the top panel 204 and to the floor surface of the vehicle. In other words, the side panel 202, the top panel 204, and the floor surface of the vehicle are parallel or relatively near parallel (e.g., with a relatively small angles between the side panel 202, the top panel 204, and the floor surface) with the side panel 202 and top panel 204 adjacent each other when folded together in the storage position. Additionally, the extension structures 212 and any extension side panel 214 can be positioned laterally inward so that they are not engaging any part of the vehicle interior, enabling the top panel 204 to hinge to the position shown in FIG. 12. In this way, the security device 102 is positioned out of the way, such as to enable access to the trunk space from outside the vehicle 100 or to facilitate storage of items that may be relatively tall and would not fit in the trunk space with the security device 102 in the secured position.

Figure 13:
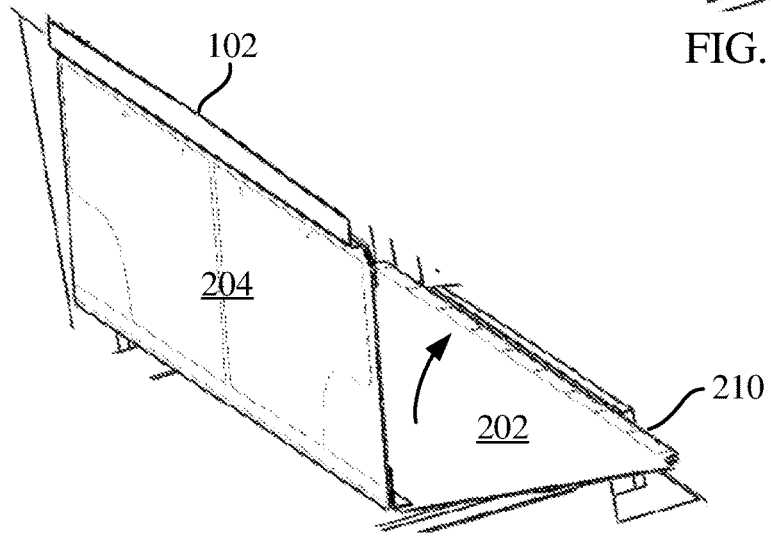
FIG. 13 is a partially sectioned isometric view of a rear of a vehicle depicting the conversion of the security device from a storage position to a secured position according to at least one embodiment of the present disclosure.
Figure 14:
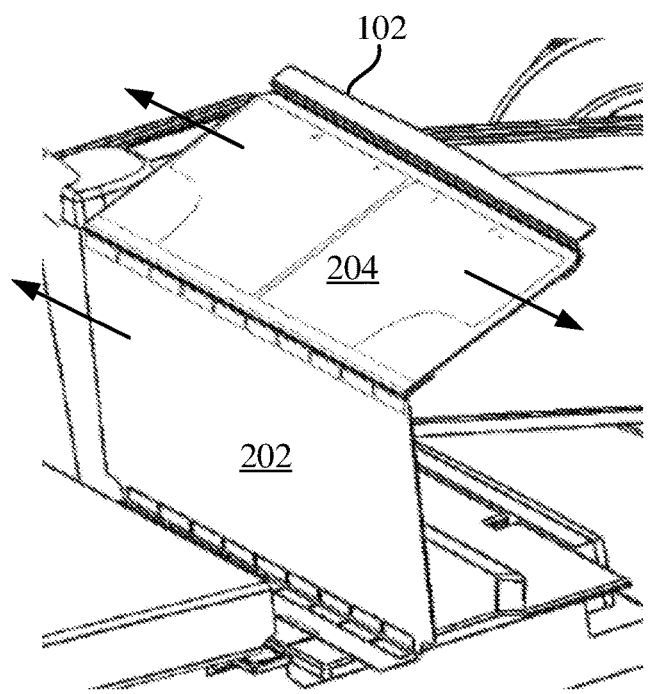
FIG. 14 is a partially sectioned isometric view of a rear of a vehicle depicting the conversion of the security device from a storage position to a secured position according to at least one embodiment of the present disclosure.

Referring now to FIGS. 12, 13, and 14, an example process for transitioning the security device 102 from the storage position to the secured position is depicted. As shown in FIG. 12, the top panel 204 can be folded forward toward the front of the vehicle, rotating about the edge 206 adjoining the top panel 204 with the side panel 202 to a position similar to that shown in FIG. 13. When the top panel 204 is positioned similar to the orientation shown in FIG. 13, the top panel 204 and the side panel 202 can be folded backward toward the rear of the vehicle, rotating about the edge 210 adjoining the top panel 204 with the attachment mechanism 208, as depicted in FIG. 13, resulting in an orientation similar to that shown in FIG. 14. As shown in FIG. 14, the extension structures 212 are still positioned laterally inward, as is any extension side panel 214. Accordingly, the extension structures 212 and any extension side panel 214 can be moved laterally outward relative to the top panel 204 and the side panel 202, as depicted in FIG. 14, resulting in an orientation similar to that shown in FIG. 15.

Figure 15:
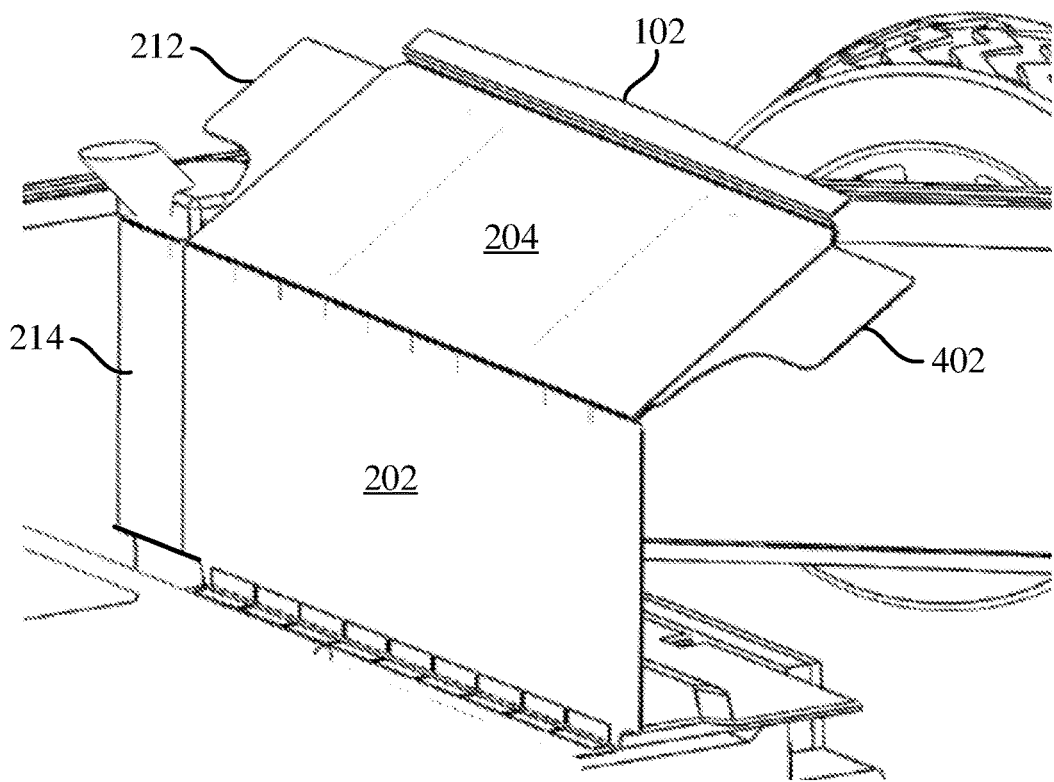
FIG. 15 is a partially sectioned isometric view of a rear of a vehicle depicting the conversion of the security device from a storage position to a secured position according to at least one embodiment of the present disclosure.
Figure 16:
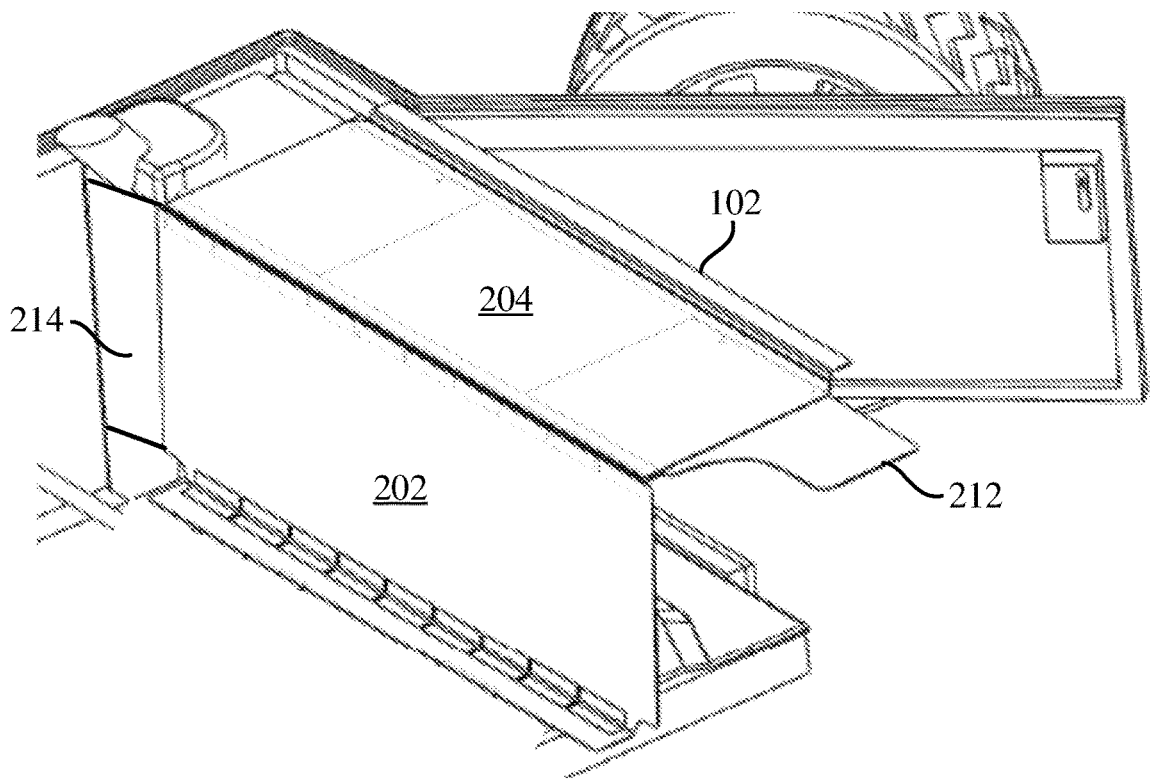
FIG. 16 is a partially sectioned isometric view of a rear of a vehicle depicting the conversion of the security device from a storage position to a secured position according to at least one embodiment of the present disclosure.

Referring to FIG. 15, with the extension structures 212 and extension side panel 214 extended laterally outward relative to the top panel 204 and the side panel 202, the top panel 204 can be secured into position to at least substantially cover the area 106 with the security device 102 in the secured position. In the secured position, the side panel 202 is positioned at least substantially transverse to the top panel 204 and to the floor surface of the vehicle as shown in FIG. 16, and the extension structures 212 and any extension side panel 214 are positioned laterally outward from the top panel 204 and the side panel 202 against a portion of the vehicle. As shown in FIG. 1, the top panel 204 can at least substantially cover the area 104 with the security device 102 in the secured position.

When the security device 102 is in the secured position, the top panel 204 is maintained in position by the extension structures 212 being adjacent the interior of the vehicle 100 and may be locked into position by the locking mechanism 502. As a result, the top panel 204 cannot be folded without reversing the operations described above for unfolding the security device 102 from the storage position to the secured position. In order to block the ability to reverse the operations described above for unfolding the security device 102 from the storage position to the secured position, the locking mechanism 502 can be employed, as well as one or more straps 1002, 1004.

Figure 17:
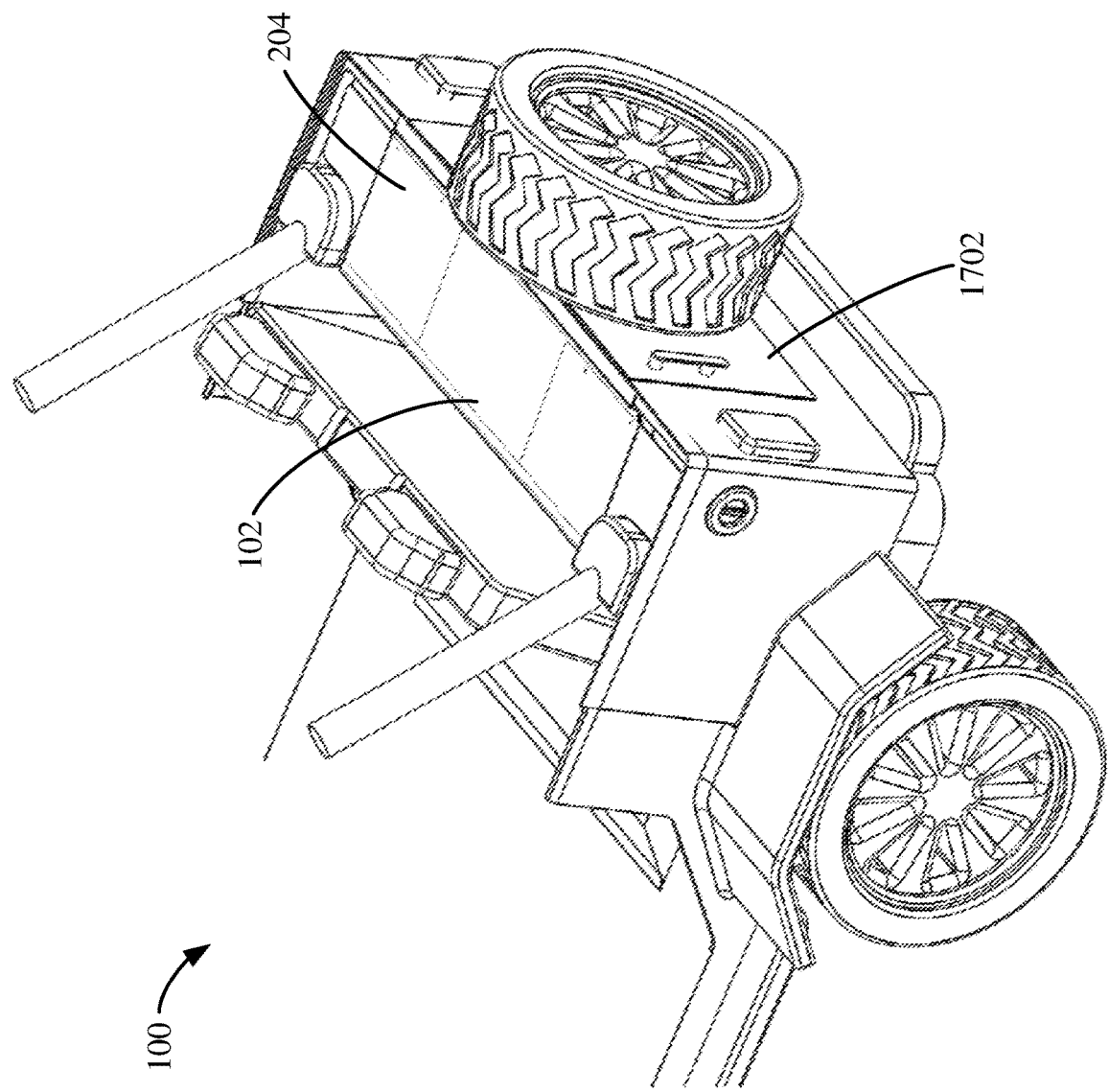
FIG. 17 is an isometric view of a rear of a vehicle with a security device in a secured position when a rear door is closed.

To finish enclosing the area 104 of the vehicle 100, a rear door 1702 can be closed, as shown in FIG. 17. The rear door 1702 can also help retain the top panel 204 from rotating upward when the rear door 1702 is closed. For example, the top panel 204 can extend partially under an edge of the rear door 1702 that inhibits the top panel 204 from rotating upward with the rear door 1702 closed. Additionally, the locking panel extension structures 212 can be configured to cover any small opening that could be accessible if they were not present.

Employing one or more embodiments of the present disclosure, a user can secure items within the area 104 of the vehicle 100 from persons outside of the vehicle. Because the extension structures 212 may be locked by the locking mechanism 502, only the user with a key to either the rear door 1702, and/or a panel door 602, 702, 802, 902 will be able to release the top panel 204, adjust the extension structures 212 laterally inward and subsequently adjust the security device 102 to the storage position.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Further, various combinations of features described herein may be employed in various embodiments, such that any embodiment may include just one or several of the features disclosed. Thus, the scope of the disclosure is only determined by the literal language, and legal equivalents, of the claims which follow.

What is claimed is:

1. A security device for securing an area within a vehicle, comprising:
   an attachment mechanism sized and shaped to be coupled to a portion of a vehicle;
   a side panel movably coupled to the attachment mechanism along a first adjoining edge of the side panel;
   a top panel movably coupled to the side panel along a second adjoining edge of the side panel, wherein the second adjoining edge of the side panel is opposite from the first adjoining edge of the side panel; and
   an extension side panel movably coupled to the side panel and configured to be adjusted laterally inward and outward relative to the side panel, wherein a portion of the extension side panel is positioned laterally outward beyond a side edge of the side panel when adjusted laterally outward, and the portion of the extension side panel is positioned laterally inward from the side edge of the side panel when adjusted laterally inward, wherein the side edge of the side panel extends between the first adjoining edge and the second adjoining edge of the side panel, wherein the laterally inward and laterally outward directions are at least substantially opposite to each other.

2. The security device of claim 1, wherein the extension side panel is coupled to the side panel by a hinge.

3. The security device of claim 1, further comprising:
   at least one extension structure coupled to the top panel and configured to be adjusted laterally inward and outward relative to the top panel.

4. The security device of claim 1, further comprising:
   a soft-top strap coupled to one of the top panel or the side panel, the soft-top strap configured to be coupled to a portion of a soft-top vehicle cover.

5. The security device of claim 1, further comprising:
   at least one strap coupled to at least one of the top panel or the side panel.

6. The security device of claim 1, further comprising:
   a motion inhibiting component coupled to the attachment mechanism and positioned to inhibit movement of the extension side panel in a secured position.

7. The security device of claim 1, further comprising:
   at least one door positioned in at least one of the top panel or the side panel.

8. The security device of claim 1, wherein:
   the side panel is positioned at least substantially transverse to the top panel in a secured position; and
   the side panel is positioned at least substantially parallel to the top panel in a storage position.

9. A vehicle, comprising:
   a trunk space with a floor surface;
   a side panel positioned within the trunk space and hingedly coupled to a portion of the trunk space;
   a top panel hingedly coupled to the side panel;
   an extension side panel movably coupled to the side panel and configured to be adjusted laterally inward and outward relative to the side panel; and
   wherein the side panel is positioned at least substantially transverse to the top panel and to the floor surface in a secured position, a surface of the extension side panel is positioned at least substantially parallel to the side panel with at least a portion of the surface extending laterally outward from a side edge of the side panel in the secured position, the side panel remains coupled to the portion of the trunk space and is positioned at least substantially parallel to the top panel and to the floor surface in a storage position, and the surface of the extension side panel is positioned laterally inward from the side edge of the side panel and adjacent to a surface of the side panel in the storage position, wherein the laterally inward and laterally outward directions are at least substantially opposite to each other.

10. The vehicle of claim 9, further comprising:
    at least one extension structure configured to be adjusted laterally inward and outward relative to the top panel.

11. The vehicle of claim 10, further comprising a locking mechanism coupled to the vehicle, wherein the at least one extension structure is positioned between the locking mechanism and a portion of the vehicle in the secured position.

12. The vehicle of claim 9, further comprising at least one door formed in at least one of the top panel or the side panel.

13. The vehicle of claim 9, wherein the extension side panel is coupled to the side panel by a hinge.

14. The vehicle of claim 9, further comprising a soft-top cover coupled to the vehicle.

15. The vehicle of claim 14, further comprising a soft-top strap coupled between the soft-top cover and at least one of the top panel or the side panel.

16. The vehicle of claim 9, further comprising at least one strap coupled between a portion of the vehicle and at least one of the top panel or the side panel.

17. The vehicle of claim 9, further comprising a motion inhibiting component positioned to inhibit movement of the extension side panel in the secured position.

18. A security device for securing an area within a vehicle, comprising:
    a top panel;
    a side panel hingedly coupled to the top panel;
    an extension side panel hingedly coupled to the side panel;
    wherein the side panel is positioned at least substantially transverse to the top panel, and the extension side panel extends laterally outward from the side panel in a secured position; and
    wherein the side panel is positioned at least substantially parallel to the top panel, and the extension side panel is positioned laterally inward relative to the side panel and adjacent the side panel in a storage position, wherein the laterally inward and laterally outward directions are at least substantially opposite to each other.

19. The security device of claim 18, further comprising:
    a motion inhibiting component positioned to inhibit movement of the extension side panel in the secured position.

20. The security device of claim 18, further comprising:
    a door positioned in at least one of the top panel or the side panel.

* * * * *